United States Patent [19]
Johnson

[11] Patent Number: 5,341,029
[45] Date of Patent: Aug. 23, 1994

[54] METHOD FOR SUPERVISING A SWITCH

[75] Inventor: Darrell E. Johnson, Fairmont, Minn.

[73] Assignee: Erwin Sick GmbH Optik-Elektronik, Waldkirch, Fed. Rep. of Germany

[21] Appl. No.: 627,124

[22] Filed: Dec. 13, 1990

[30] Foreign Application Priority Data

Dec. 14, 1989 [DE] Fed. Rep. of Germany ....... 3941319

[51] Int. Cl.⁵ ..................... G08B 21/00; G01R 31/02
[52] U.S. Cl. .................................. 307/112; 340/644; 324/418
[58] Field of Search ............... 307/112, 116, 125, 134, 307/137, 138; 340/644, 652; 324/415, 418, 422, 537

[56] References Cited

U.S. PATENT DOCUMENTS 4,484,180  11/1984  Deforeit ............................. 340/365
4,777,479  10/1988  Hinckley ............................ 340/644

Primary Examiner—A. D. Pellinen
Assistant Examiner—Michael A. Friedhofer
Attorney, Agent, or Firm—Townsend Townsend Khourie & Crew

[57] ABSTRACT

The invention relates to a method for the supervision of a switch, in which a switch supervision signal (CA1, CA2, CB1, CB2) is generated and transmitted to the switch contact to be supervised, and in which the switch supervision signal (CA1, CA2, CB1, CB2) returning from the switch contact is detected and compared with the emitted signal. A coded signal is used as switch supervision signal (CA1, CA2, CB1, CB2) and this coded signal is transmitted serially to the switch contact to be supervised.

10 Claims, 3 Drawing Sheets

METHOD FOR SUPERVISING A SWITCH

The invention relates to a method for supervising a switch, in which a switch supervision signal is produced and transmitted to the switch contact to be supervised, and in which the switch supervision signal returning from the switch contact is detected and compared to the transmitted signal.

In modern machine control installations, it is attempted to dispose all control and safety circuits centrally in a circuit case. The operation of each machine is however often effected from place, such that it is necessary to control certain functions of the machine by means of externally mounted switches. When these switches are dedicated to safety functions, it is necessary to use reliable external switches having a low defect rate, which must be additionally supervised.

For this switch supervision it is thus absolutely necessary to supervise the switch with respect to disturbances or defects as well as with respect to its switching condition. Since the circuit for supervision of the switch must also be disposed in the central switch case, the switch supervision signals must be transmitted to the switches to be supervised via relatively long wires, and none of the outer disturbance causes, such as for instance noises in the mains should disturb the supervision of the switch. In order to prevent such disturbances it is for example possible to use shielded wires for the switch supervision. This is however comparatively expensive and complicated.

The object of the invention is to achieve a method for the supervision of a switch of the initially named kind, which makes it possible to obtain faultless switch supervision, free of disturbances, without requiring additional lines for the transmission of the signal.

This object is met according to the invention by using a coded signal as the switch supervision signal, the coded signal being transmitted serially to the switch to be supervised.

By the use of a coded signal as switch supervision signal according to the invention, it is possible to recognize the signal returning from the switch as the emitted signal in a faultless manner, even in the presence of disturbances like noises in the mains. Correspondingly, the disturbance signals present on a line returning from the switch can be safely distinguished from the switch supervision signal. In this manner it can be accurately ensured that the switch signals further transmitted by the switch to be supervised, which can for example originate from a safety device like a light curtain, are only considered as such when the switch is in the correct position.

When for example a signal is delivered by a light curtain, showing that the light curtain is not interrupted, this signal is only interpreted as an enabling signal for a dangerous machine when the switch is simultaneously devoid of errors.

In order to further reduce the sensitivity to disturbances of the methods for switch supervision, provision is made in a first practical example of development of the invention that the switch supervision signal is a binary coded signal, the code for each switch supervision signal being freshly generated by a random generator.

The generation according to the invention of a digital, binary coded switch supervision signal, the binary code of which being generated at random or pseudo-random, ensures in a particularly safe manner that electric noises, caused for example noises in the mains, do not affect the reliability of the supervision methods. Such pseudo-random digital signals represent the best possibility to reduce the disturbing influence of electric in the signal transmission.

According to a further development of the invention, provision is made that separate bits of the binary coded switch supervision signal have a different time duration, the even and the odd bits following each other having each the same time duration. By selecting different time duration of the bits one not only achieves a further possibility of avoiding transmission errors, but also simultaneously ensures that the switch supervision according to the invention can be synchronized with other monitoring methods serving for the safety of operation. For example this makes it possible to carry out the supervision of the switch simultaneously with the detection and the evaluation of reception signals of a light curtain by one and the same evaluation circuit, which preferably comprises a microprocessor.

It has proved particularly convenient to form the switch supervision signal as an 8-bit-word.

With the method according to the invention, when switches having several switch contacts must be supervised, provision is made, in accordance with the invention, that the switch supervision signals for the switch contacts to be supervised separately are emitted in parallel in the same time, an individual switch supervision signal for each switch contact being generated by means of a random generator.

Through the use of switch supervision signals coded at random for the different switch contacts of the switch to be supervised, which are emitted simultaneously, the time necessary for the switch supervision will be kept comparatively short, without affecting the perfect recognition of a faultless switch.

In order to improve the accuracy of the method according to the invention, a further development of the invention provides that each switch contact is verified by means of at least four successive switch supervision signals, in order to safely determine the condition of the switch.

In order to synchronize the separate method steps of the method according to the invention with another supervision method related to safety, a further development of the invention provides that a pause is provided between two successive switch supervision signals.

A particularly preferred example of development of the invention is characterized in that each of two successive switch supervision signals are generated by means of two random generators operating independently from each other and are emitted and detected via a common line by means of two circuits operating independently from each other, the two circuits being synchronized to each other.

According to the invention, it is further provided that each of two successive switch supervision signals for one and the same switch contact are generated and evaluated independently from each other, but are transmitted to the switch contact to be supervised via a common line. This is preferably achieved, by way of example, by means of two microprocessors or microprocessor units, which operate independently from each other except for their time synchronization, the use of switch supervision signals coded at random making it possible to use a single transmission line for each switch contact to be supervised. Each of the two microprocessors operates in this case with as many channels as there are switch contacts to be supervised.

The method according to the invention makes thus possible to carry out the supervision of several switch contacts in a very short time and with a low number of connection lines, without the supervision of the separate switch contacts which is carried out in parallel timewise leading to mutual disturbances with a faultless switch.

The invention will be explained in more detail in the following with reference to the drawings, in which.

Figure 1:
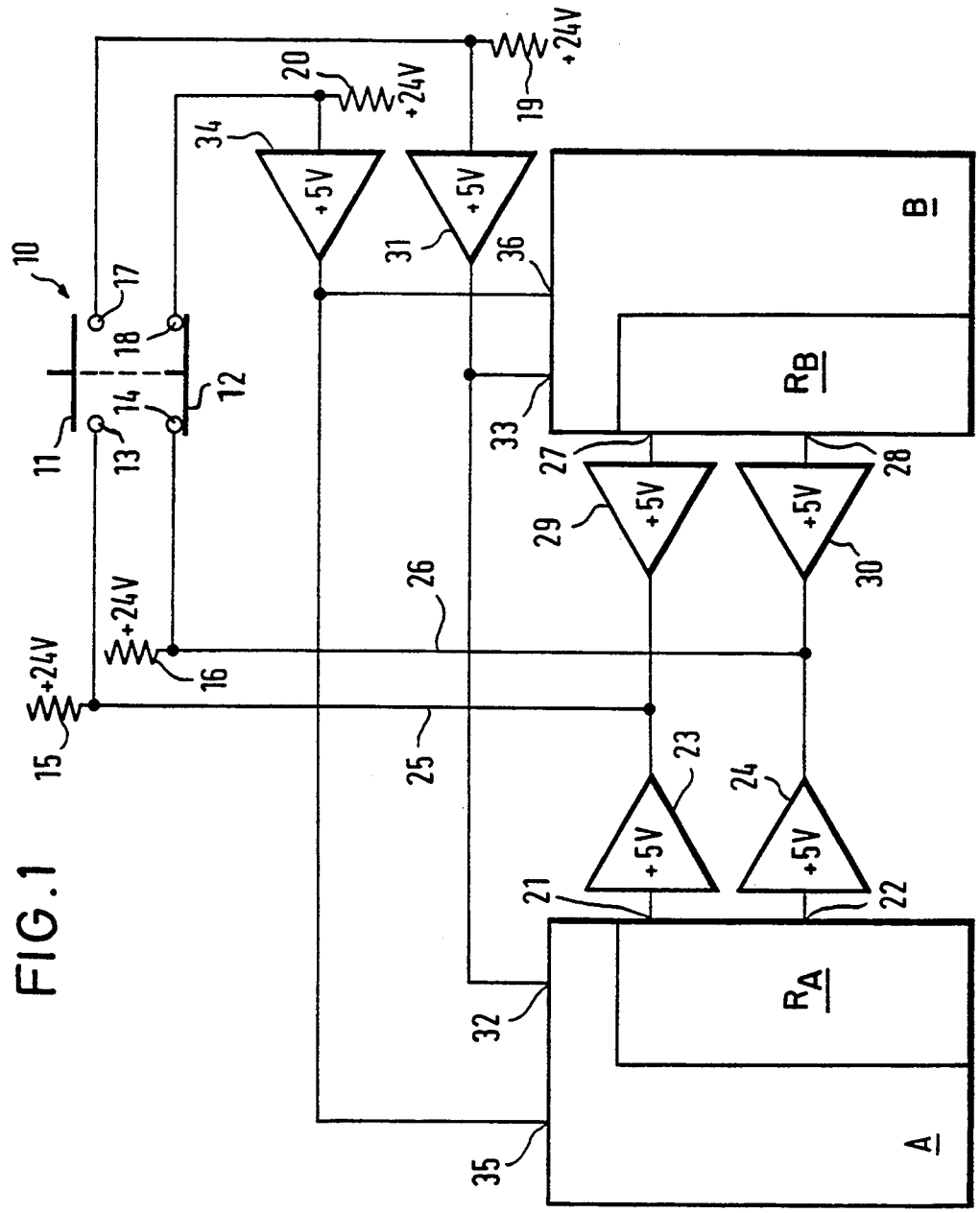
FIG. 1 is a schematic circuit diagram of a switch supervision circuit.

FIG. 1 shows schematically a restoring switch 10 to be supervised, having a normally open contact 11 and a normally closed contact 12.

A first microprocessor A produces, by means of a random generator $R_A$, a first and a second switch supervision code CA1 and CA2, respectively, which are each applied to the input terminals 13, 14 of the switch 10 via output buffer memories 23, 24 connected to code outputs 21, 22 and via supervision lines 25, 26. In this case so-called open collector buffer memories can be used as output buffer memories 23, 24.

A second microprocessor B generates switch supervision codes CB1 and CB2 in a corresponding manner by means of a random generator $R_A$, which are applied to the supervision lines 25, 26 via the output buffer memories 29, 30 connected to code outputs 27, 28, in order to be applied to the switch 10. The output buffer memories 29, 30, which can also be open collector buffer memories, can be linked with the corresponding output buffer memories 23, 24 of the other microprocessor A, B in a manner not represented using an OR-gate or OR-logic circuit.

It will be understood that random number generators $R_A$ and $R_B$ can be pseudo random number generators. As previously set forth, pseudo random digital signals from such pseudo random number generators represent the best possibility of reducing the disturbing influence of electric noises in the signal transmission.

Instead of providing an output buffer memory for each output 21, 22, 27, 28 of the microprocessors A, B a common output buffer memory can be provided for mutually associated outputs of the microprocessors A, B, the OR-linking of the corresponding outputs being effected before the output buffer memories. In this manner, the number of output buffer memories can be reduced by means of a corresponding circuit design.

In the illustrated example or embodiment, the outputs of the output buffer memories 23, 29 and 24, 30, respectively, are supplied with a positive direct current of +24 Volt via bias resistors 15, 16 and via the supervision lines 25, 26, in order to bias the outputs of the output buffer memories 23, 29 and 24, 30, respectively, to a high potential value representing a logic value 1. In this case, each output buffer memory 23, 24, 29, 30, to which a switch supervision code CA1, CA2, CB1, CB2 is applied, is in the situation to drop the applied bias tension to a low potential value representing a logic level 0.

The output terminal 17 associated with the normally open contact 11 is connected with an input of a buffer or line amplifier 31, whose output is connected to a supervision input 32 of the first microprocessor A and to a supervision input 33 of the second microprocessor B. In the same manner, the output terminal 18 of the switch 10 associated with the normally closed contact 12 is connected to an input of a buffer or line amplifier 34, whose output is connected to a second supervision input 35 of the first microprocessor A and to a second supervision input 36 of the second microprocessor B.

A bias potential of +24 Volt is also applied to the inputs of the line amplifiers 31, 34 via bias potential resistors 19, 20, in order to maintain the inputs of the line amplifiers 31, 34 at a high potential representing a logical level 1, when the corresponding switch contact 11, 12 is open. In this manner, it is attained that potentials clearly representing logical values are always present at the inputs 32, 33, 35, 36 of the microprocessors A, B.

By means of corresponding circuit designs not represented, it is however also possible to apply other defined potentials at the outputs or inputs of the microprocessors A, B or of the amplifiers 23, 24, 29, 30, 31, 34.

Figure 2:
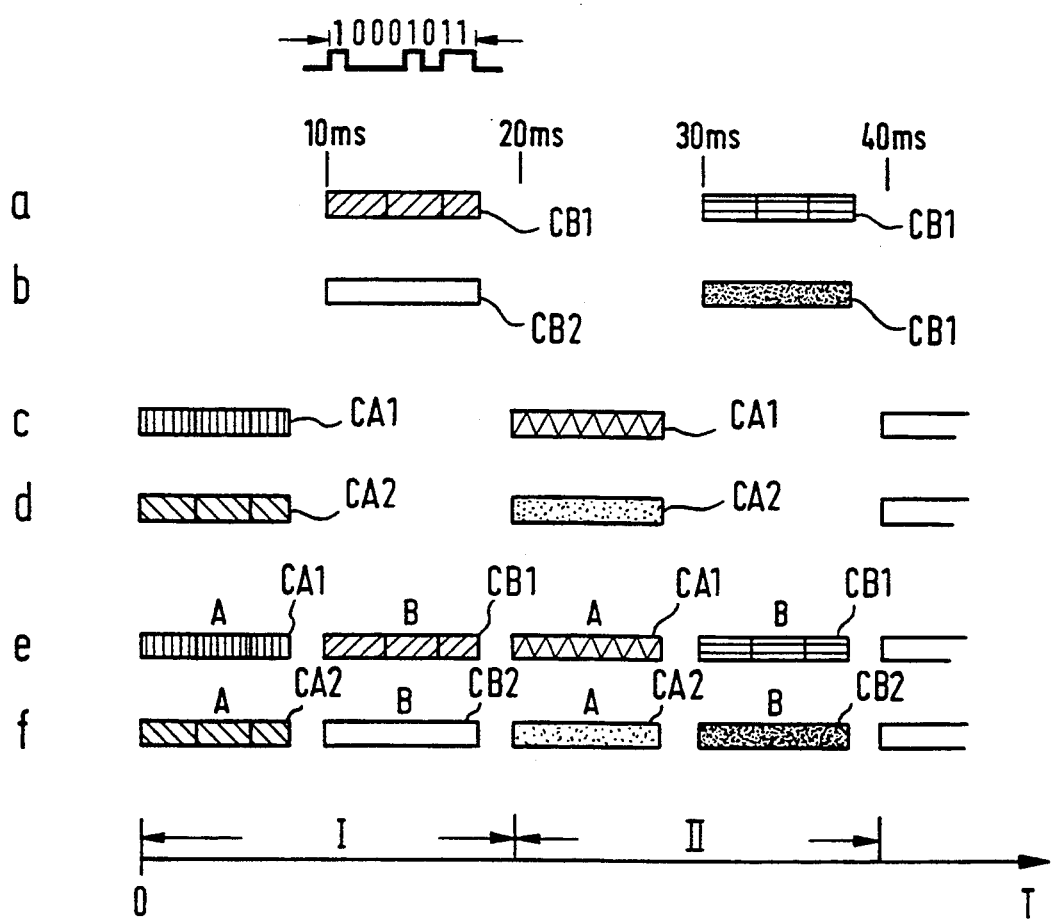
FIG. 2 is a time diagram in which the switch supervision codes are schematically illustrated and FIG. 3 is a further time diagram, in which the time synchronization of a switch supervision code is illustrated with the tracing of a safety device.

As indicated in lines c and d in FIG. 2, the first microprocessor A simultaneously generates, in the first part of a code transmission period I or II, each of two switch supervision codes CA1 or CA2, which differ from each other, for the two contacts of the switch 10 to be supervised, whereas the second microprocessor B generates, during the second part of a code transmission period I or II, two switch supervision codes CB1 and CB2 which differ from each other.

As indicated in FIG. 2 by means of different hatching of the blocks representing the switch supervision codes, the switch supervision codes respectively generated by the two microprocessors A, B are in any case all different from each other for a long time duration in comparison to the time duration of the switch supervision codes.

The switch supervision codes CA1, CA2, CB1, CB2 consist for example of 8-bit-words, having for example a duration of 8 ms and are each emitted serially.

As indicated in lines e, f in FIG. 2, a supervision code CA1, CA2 from the first microprocessor A and a supervision code CB1, CB2 from the second microprocessor B are transmitted serially, thus after one another, to each of the contacts 11, 12 of the switch 10 to be supervised during each code transmission period I, II via the supervision lines 25, 26. Each microprocessor A, B transmits the supervision codes CA1, CA2; CB1, CB2 it has itself produced simultaneously to the contacts 11, 12 to be supervised.

Instead of transmitting a complete supervision code in each case it is also possible for the supervision of the corresponding contact 11, 12 to transmit first the first half of the corresponding supervision code CA1, CA2, and to transmit thereafter the first half of the supervision code CB1, CB2 of the second microprocessor B. The rest of the first supervision code CA1, CA2 is then transmitted after the first part of the second supervision code CB1, CB2, whereafter the transmission of the rest of the second supervision code CB1, CB2 is effected. This transmission sequence is then repeated during the following code transmission period.

Thus, for the supervision of the switch 10 in its normal condition, when the normally open contact 11 is open and the normally closed contact 12 is closed, the microprocessor A directs or transmits the corresponding switch supervision codes CA1, CA2 to the switch 10 via the supervision lines 25, 26.

When now, for example the normally closed contact 12 is open as a result of a defect in the switch, the microprocessor A recognizes both contacts as open. If, conversely, the normally open contact 11 is closed as a result of a defect in the switch, this condition is detected by the microprocessor A and the latter also determines a defect in the switch. If both contacts 11, 12 of the switch 10 are in direct contact with each other, for example as a result of a thermal adherence, the microprocessor receives at least an undefined non-recognizable signal at one of its supervision inputs, which will be again interpreted as a defect switch.

An important advantage of the use of random generated switch supervision codes can now be seen. If for example, the normally open contact 11 of the switch 10 is short-circuited with the normally closed contact 12, so that it indeed receives an input signal from the supervision line 25 but does not transmit the latter to the output terminal 17, then the two switch supervision codes CA1 and CA2 are superposed, such that an undefined signal succession occurs at the second supervision input 35, from which a defect switch can be determined. If both signal supervision codes CA1 and CA2 were identical they would superpose in synchronism, such that the microprocessor A could not recognize the erroneous condition of the switch 10.

The microprocessor B operates with a time shift in the same manner as the microprocessor A and provides a redundance in the switch supervision.

In the example described with reference to FIG. 2 the microprocessor A needs about 10 ms for performing a switch supervision step in which a switch supervision code is emitted and verified. Thereafter the microprocessor A waits until the second microprocessor B has also performed a switch supervision step, in order to perform then a second verification of the condition of the switch with a new set of switch supervision codes, while the second microprocessor waits, to perform its second switch supervision step. Only when both microprocessors A, B have successfully performed two switch supervision steps is the condition of the switch determined as being correct, for which a time duration of about 40 ms is necessary.

By virtue of mechanical tolerances of the switch 10 it is possible that the mechanically coupled contacts 11, 12 can be briefly simultaneously opened or closed during the actuation of the switch. In order to avoid that such a condition of the switch caused by tolerances being detected as an error, an erroneous switch condition of this type will only be evaluated as a switch defect when it remains for example for more than 200 ms.

Figure 3:
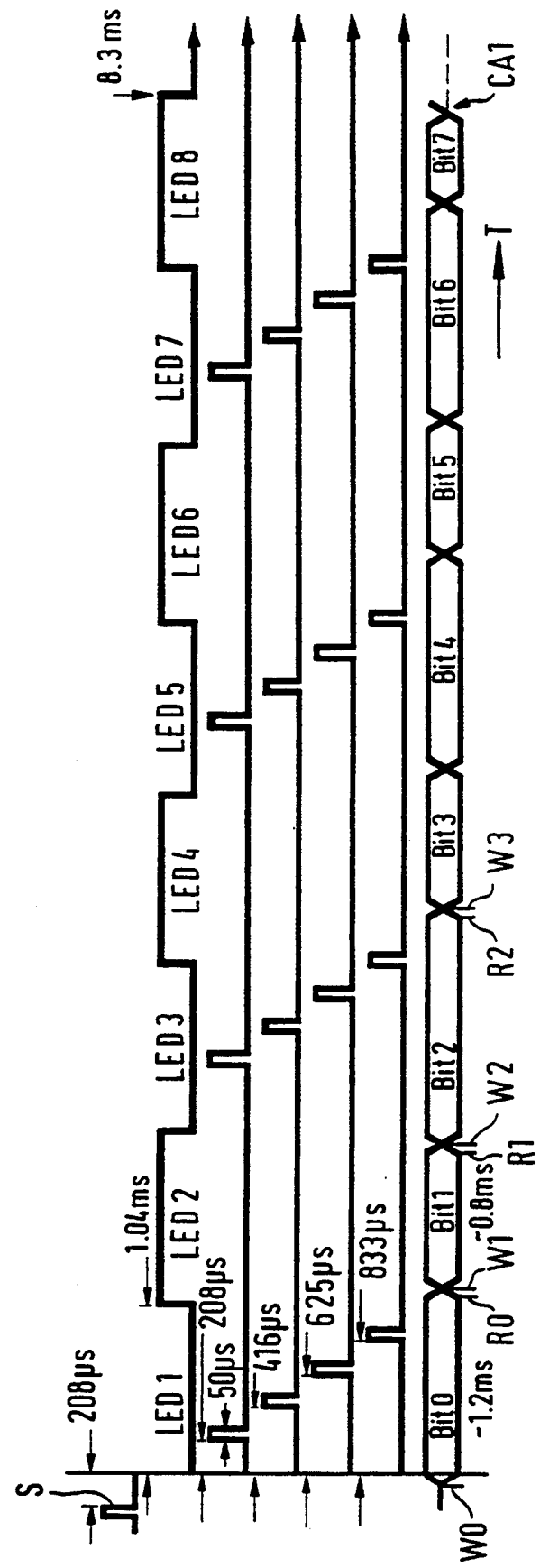

The operation of the above-described switch supervision circuit together with a safety device, for example, a light curtain for a dangerous machine will now be described with reference to FIG. 3.

When the described switch supervision circuit is used together with a light curtain in a machine, the function of the microprocessors A, B can then be ensured by suitable microprocessor sections in the evaluation circuit of the light curtain. In this case, in order to make a time distribution of the supervision functions performed individually by the microprocessor, the switch supervision is synchronized in dependence on synchronisation pulses with the detection and the evaluation of the reception signals of photodetectors of the light curtain in dependence on synchronous pulses S.

The first bit, thus bit 0, of a switch supervision code CA1 is applied to the code output 21 of microprocessor A or to a corresponding microprocessor section of the evaluation circuit of the light curtain, before the first reception pulse of a photodetector, for example a photodiode, is detected by various circuits of the evaluation circuit. After the first photodetection signal has been detected by all circuits of the evaluation circuit, the detection signal is detected at the supervision input 32 at a time R0 and the following bit, thus bit 1, of the switch supervision code CA1 is applied at the code output 21 at a time W1. During this sensing time the microprocessor evaluates the detected photodetector information, in order to determine the presence of an interruption of the light curtain which may be present. At the end of the second sensing time LED2 the supervision code signal present at the supervision input 32 is read at time R1 and the third bit, thus bit 2, is applied at the code output 21 at time W2, in order to be transmitted to the supervision input 32 through the switch contact to be supervised. As soon as the third bit, thus bit 2, of the switch supervision code CA1 is present at the code output 21, the microprocessor performs again a sensing of the photodetection signal during the third sensing time LED3, i.e.: the photodetection signal is sensed by the various circuits of the microprocessor, so as to be evaluated after reading the third bit and after the emission of the fourth bit of the switch supervision code CA1 at time R2 or W2 during the fourth sensing time LED4.

This process is repeated until the 8 bits of the switch supervision code CA1 are all emitted and detected.

For the emission and the detection of a switch supervision code comprising 8 bits, a time duration of about 8.3 ms is necessary. Each of two successive bits of the switch supervision code have in this case a different time duration, the bits having a time duration between 0.8 ms (bit 1, 3, 5, 7) and 1.4 ms (bit 0, 2, 4, 6), while the sensing times LED1, 2, . . . are of about 1 ms.

In particular, as can be seen from FIG. 2, the individual switch supervision codes CA1, CA2, CB1, CB2 are each emitted with a time delay between each other, such that the synchronisation of the individual method steps of the switch and light curtain supervision can be verified.

Since each microprocessor A, B emits and detects at least two switch supervision codes in order to safely determine the switch condition of a switch, the shortest switch closing time which can be determined is four times the duration of a sensing cycle. Since a sensing cycle has for example a duration between 8.3 ms and 10 ms, the detectable switch closing time is about 33.2 ms and 40 ms.

I claim:

1. A method for supervising a switch having at least first and second contacts for transmitting across said switch at said contacts electrical current, comprising the steps of:

generating a coded switch supervision signal distinct from said electrical current by a random generator;

serially transmitting said coded switch supervision signal to the switch at one of the contacts to be supervised;

modulating any electrical current across said switch at said contacts with said coded switch supervision signal;

providing a return path from said switch at the other of said contacts for the coded switch supervision signal;

comparing any returned coded switch supervision signal to the transmitted coded switch supervision signal and generating a first indicia indicating a first state of said switch when said transmitted code supervision signal is recognized and a second indicia indicating a second state of said switch when said coded signal is not recognized.

2. A method according to claim 1 and wherein said generating step includes:

generating a binary coded signal.

3. A method according to claim 2 and wherein said generating step includes:

generating discrete bits of the binary coded switch supervision signal having different time durations.

4. A method according to claim 3 and wherein said generating step includes:

generating discrete bits of binary coded switch supervision signals having even and odd bits wherein said the even and the odd bits are each of the same time duration.

5. A method according to claim 2 and wherein said generating step includes:

generating a coded switch supervision signal having an 8-bit-word.

6. A method according to claim 1 and wherein said switch has third and fourth contacts and wherein said generating step includes:

generating at least two distinct coded switch supervision signals;

serially transmitting one of said coded switch supervision signals to one of said first and second contacts;

serially transmitting the other of said coded switch supervision signals to one of said third and fourth contact to be supervised;

providing return paths from the other of each said contacts; and, comparing each said coded switch supervision signal with said transmitted coded switch supervision signal.

7. A method according to claim 1 and wherein said generating and comparing steps includes:

generating at least four said switch supervision signals; and comparing said at least four switch supervision signals in succession order to reliably determine the condition of the switch.

8. A method according to claim 7 and wherein said generating step includes:

generating said at least four switch supervision signals with a pause provided between two successive switch supervision signals.

9. A method according to claim 7 and wherein said generating and transmitting step includes:

generating two successive switch supervision signals by means of two random number generators operating independently from each other; and, transmitting via a common line by means of two circuits operating independently from each other said two successive switch supervision signals, said two circuits being synchronized with each other.

10. A method according to claim 1 and wherein said generating step includes:

generating said coded switch supervision signal by a pseudo-random generator.

* * * * *